United States Patent
Bugenhagen

(10) Patent No.: US 7,940,912 B2
(45) Date of Patent: May 10, 2011

(54) SYSTEM AND METHOD FOR VIRTUAL WIRELESS CALLING

(75) Inventor: Michael K. Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1107 days.

(21) Appl. No.: 11/712,073

(22) Filed: Feb. 28, 2007

(65) Prior Publication Data

US 2008/0152120 A1    Jun. 26, 2008

Related U.S. Application Data

(63) Continuation-in-part of application No. 11/644,338, filed on Dec. 22, 2006.

(51) Int. Cl.
*H04M 7/00* (2006.01)

(52) U.S. Cl. ......... 379/221.15; 379/221.01; 379/221.02; 379/211.01; 379/211.02; 379/212.01

(58) Field of Classification Search ............. 379/221.15, 379/211.01, 211.02, 212.01, 221.01, 111, 379/161, 280, 288, 355.09; 455/435.1, 445, 417

See application file for complete search history.

(56) References Cited

U.S. PATENT DOCUMENTS

| | | | | |
|---|---|---|---|---|
| 5,966,653 | A * | 10/1999 | Joensuu et al. | 455/445 |
| 6,216,000 | B1 * | 4/2001 | Blumhardt | 455/435.2 |
| 6,330,448 | B1 * | 12/2001 | Otsuka et al. | 455/436 |
| 6,393,271 | B1 * | 5/2002 | Dougherty | 455/411 |
| 2002/0186832 | A1 * | 12/2002 | Mani | 379/355.01 |
| 2004/0101124 | A1 * | 5/2004 | Koch et al. | 379/220.01 |
| 2004/0110465 | A1 * | 6/2004 | Bedingfield et al. | 455/3.05 |
| 2005/0202810 | A1 * | 9/2005 | LaPallo | 455/426.1 |
| 2006/0019653 | A1 * | 1/2006 | Stamoulis et al. | 455/425 |
| 2007/0066270 | A1 * | 3/2007 | Dantu et al. | 455/331 |
| 2007/0140464 | A1 * | 6/2007 | Di Giorgio et al. | 379/221.02 |
| 2007/0274287 | A1 * | 11/2007 | Yu et al. | 370/351 |

* cited by examiner

*Primary Examiner* — Curtis Kuntz
*Assistant Examiner* — Joseph J Nguyen
(74) *Attorney, Agent, or Firm* — SNR Denton US LLP

(57) ABSTRACT

A system and method is provided for call routing from a wired telephone switch. A virtual number may be registered with a database of the wired telephone switch for call routing. Outgoing calls are routed from a standard telephone utilizing the virtual number. The virtual number is unregistered to disable the call routing from the standard telephone.

24 Claims, 5 Drawing Sheets

SYSTEM AND METHOD FOR VIRTUAL WIRELESS CALLING

CROSS-REFERENCES TO RELATED APPLICATION

This application claims priority under 37 C.F.R. 1.53(b) to U.S. application Ser. No. 11/644,338, entitled "System and Method for Virtual Wireless Roaming", filed Dec. 22, 2006, as a continuation-in-part thereof, which is hereby incorporated herein by reference.

BACKGROUND

Wireless communications has grown nearly exponentially in recent years. The growth is fueled by larger networks with more reliable protocols and better communications hardware available to service providers and consumers. The increasing demand for wireless communications requires enhanced operability between wireless and wired networks. In many cases, telephony switches are limited by standards, such as Third Generation Partnership Project 2 (3GPP2). The 3GPP2 provides a third generation mobile system that allows, for example, a single switch to implement information management system behavior over both wireless and wired packet environments. The limitations of the standards prevent all features of both wired and wireless networks from being fully integrated and accessible through legacy wired telephone switches.

Despite improving wireless technology, wireless-to-wireless calls are still plagued by poor quality of service (QoS). Additionally, many wireless service providers lack coverage in rural communities because of the expansive geographic areas that must be covered and the expense of making coverage to a limited population. Quality of service is a generic term for measuring and maintaining the quality of a network including particularly latency and voice quality for wireless communications. Many users notice quality of service problems when phone calls are dropped, delayed, or otherwise scrambled or made unrecognizable. Quality of service is not a significant problem for traditional wired phone service providers. Unfortunately, the switches and devices used by wired and wireless networks are not well integrated for providing both quality of service and wireless accessibility.

In many cases, a wireless user may prefer to use a wired telephone because of the better quality of service despite having service features, such as free nights and weekends and wireless-to-wireless minutes. In other situations, the user may not have wireless coverage at home and is therefore required to use the wired telephone to make outgoing phone calls. As a result, the wireless service plan is not fully utilized costing the user money and available resources.

SUMMARY

One embodiment includes a method for call routing from a wired telephone switch. A virtual number may be registered with a database of the wired telephone switch for call routing. Outgoing calls are routed from a standard telephone utilizing the virtual number. The virtual number is unregistered to disable the call routing from the standard telephone.

Another embodiment includes a wired telephone switch. The wired telephone switch includes a processor for executing instructions within software modules and a memory operatively connected to the processor for storing the software modules. The software modules include a routing trigger configured to register a wireless device as roaming with the wired telephone switch operative to route outgoing calls from a standard telephone through a wireless network. The software modules further include a database configured to store a dialing code associated with the wireless device for routing the outgoing calls to an intended recipient.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Various illustrative embodiments of the present invention provide a system, method and apparatus for virtual wireless calling. A user may provide user input to enable a wired telephone to participate in a wireless phone plan by changing the call routing and possibly the digital set number to a ghost number, alternative digital number, or virtual number to be used in association with outgoing trunk selection for long distance and local calls. Once a wire-line or standard telephone user activates the virtual wireless calling, all or a portion of the dialed or outgoing calls may be routed to the wireless carrier based on routing tables, databases, or other call session control information. As a result, the caller is able to use the wireless service plan, including long distance, minutes, in-network calling, and other available features without a linked wireless device. The virtual number may be a wireless number designated by the wireless carrier as part of a wireless service plan or may be an unused wire-line subscriber number.

The wireless system being integrated with will have a virtual or "ghost" number that is not associated with a wireless device, but is part of a wireless service plan. The number could be a wire-line number or an unused wireless number that is used by the wireline phone one placed in the virtual wire-less state.

The standard telephone is a wire-line or land line phone using analog, digital, or voice over Internet Protocol (VoIP). When the wire-line phone is placed into the virtual wireless state by user actions or the wireline switch, all or a portion of the outgoing calls from the standard telephone are sent as if they originated from the virtual number. The outgoing call is routed through the wireless provider's network using a digital number, virtual number, or special identifier assigned to the line when the line is in the virtual wireless state. The class 5 switch routes calls to the mobile switch over an inter machine trunk (IMT), using an internal circuit identification code (CIC) or primary interexchange carrier (PIC) code when the wired-phone is in the virtual wireless state. Any minutes, services, bills, or charges associated with the outgoing calls are billed to the associated virtual number and associated wireless service plan according to agreements between the wireless provider and the telephone company providing service to the standard telephone.

Figure 1:
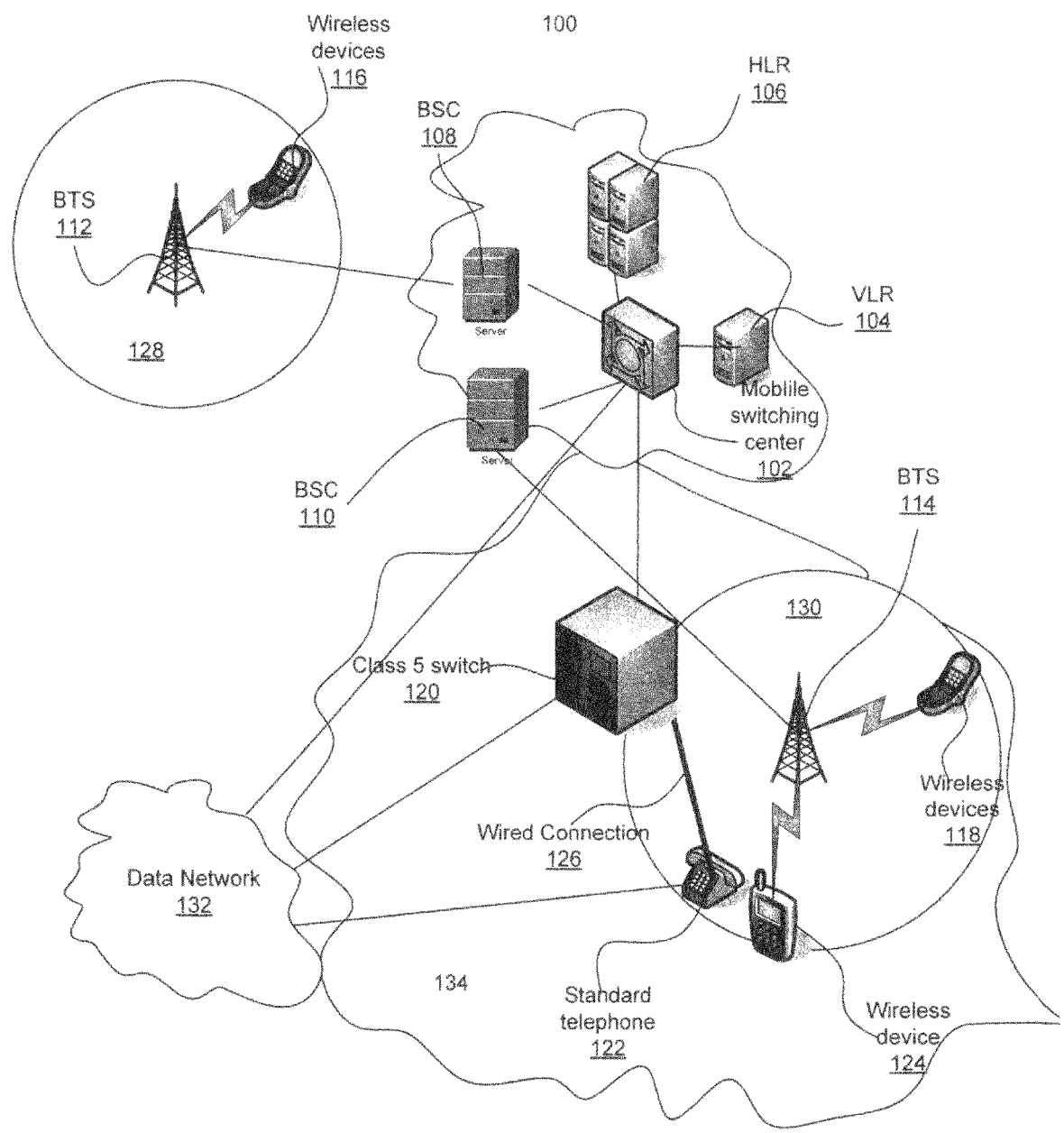
FIG. 1 is a perspective diagram of a communications system in accordance with the illustrative embodiments of the present invention.

FIG. 1 is a perspective diagram of a communications system in accordance with an embodiment of the present invention. The communication system 100 of FIG. 1 includes numerous devices and elements including a mobile switching center 102, a virtual location register (VLR) 104, a home location register (HLR) 106, base station controllers (BSC) 108, 110, base transceiver stations (BTS) 112, 114, wireless devices 116, 118, a class 5 switch 120, a standard telephone 122, and a wireless device 124. A class 5 switch 120 shall mean a switch using technology to provide telecommunications services. For example, the class 5 switch 120 may be a wire-line switch or public exchange using time domain multiplexing to provide telecommunications services to a particular subscriber or groups of subscribers. The class 5 switch 120 may be located at a local telephone company's central office, or at a business location serving as a private branch exchange. The class 5 switch 120 may provide dial-tone, calling features, and additional digital and data services to subscribers. The class 5 switch 120 may be connected to the standard telephone 124 by a wired connection 126. Communications within the communication system 100 may occur on any number of networks which may include wireless networks 128, 130, a data network 132, and a publicly switched network 134.

The mobile switching center (MSC) 102 may be a switch used for wireless call control and processing. The MSC 102 also serves as a point-of-access to the publicly switched network 134 through the class 5 switch 120. The MSC 102 is a sophisticated telephone exchange which provides circuit-switched calling, mobility management, and global system for mobile (GSM) communications or personal communications system (PCS) services to the mobile phone located within the area the MSC 102 serves.

The features of the present invention are implemented by the class 5 switch 120. The class 5 switch 120 is a wired telephone switch or exchange interconnected with the MSC 102 or the long distance network being used by the MSC 102. In many cases, the class 5 switch 120 is located within or in close proximity to the central office of a local telephone company. The class 5 switch 120 provides basic dial tone, calling features and additional analog, digital, and data services to the subscribers of the publicly switched network 134. In this example, the class 5 switch 120 provides dial tone and service to the standard telephone 124. The class 5 switch 120 may also enable voice over Internet protocol (VoIP) communication of the standard telephone 124 through the data network 132. VoIP works through sending voice information in digital form in packets, rather than in the traditional circuit-committed protocols of the publicly switched network 134.

The class 5 switch 120 includes various elements and modules that allow the class 5 switch 120 to emulate a mobile switching center, such as mobile switching center 102. Particularly, the class 5 switch 120 may include a mobile carrier code, a PIC code or CIC for dialing, a routing trigger and multiple databases and tables for storing numbers and other information. The SS7 protocol functions may be used to handle roaming control signals to one or more HLR 106. Each element of the class 5 switch functions together to allow call and data routing from the wireless device 124, the standard telephone 122, the publicly switched network 134 and the wireless service provider operating the MSC 102. In one embodiment, the wireless roaming elements and components are integrated with the class 5 switch 120. In another embodiment, the PIC code and the CIC, the routing trigger, and the mobile carrier code, may be part of external components communicating with the class 5 switch 120 using a signal control protocol or application program interface (API). For example, all of the class 5 switch 120 components used for roaming may be part of an external VLR or other advanced intelligent network (AIN) device.

In one embodiment, a user may order, implement, initiate, or otherwise request the routing service using a routing command. The command may be implemented by a user action during dialing. Specific user feedback such as a specific dial tone signal or other message, may signal to the user that roaming is active from the class 5 switch. The user may specify the phone number or virtual number from which calls from the wireless device 124 are to be sent. For example, the user may have a wireless service plan for a family of three which includes four numbers, one of which is a virtual number not associated with a wireless device. Each of the phone numbers including the virtual number may be used to make phone calls from the standard telephone as individually designated. As a result, the standard telephone may be used to make free wireless-to-wireless calls when using the virtual number to dial one of the other three numbers included in the wireless service plan for the family. Long distance calls are charged to the wireless service plan just as calls made from the other three wireless devices.

A user may use the wireless device 124 for mobile communications by accessing numerous compatible wireless networks. At any time, the user may select to have calls destined for the virtual number routed to the standard telephone 124 and outgoing calls sent from the standard telephone 124 as if the calls originated from the wireless device 124. The wireless user may enable the routing in a number of ways. The wireless user may use a routing command to enable the call routing. The routing command is a signal generated to activate the routing trigger of the class 5 switch 120 for call routing. In one example, the user may submit a routing command by dialing *79 on the standard telephone 124. The routing command may also be a password, voice activated, time activated, preset by the user or any other suitable option, setting, command, or user input.

The class 5 switch 120 and MSC 102 communicate using a signal control protocol, such as a signaling system number 7 (SS7) protocol. The SS7 protocol is used in publicly switched networks to establish connections between switches, performing out-of-band signaling in support of the call-establishment, billing, routing, and information-exchange functions of the publicly switched network 134.

The wireless carrier provides the IMT or specialized trunk to the local carrier operating the class 5 switch 120 for bundled minutes of incoming and outgoing phone calls so the local phone provider may switch the minutes from a normal long distance company to the wireless carrier to share the wireless plan minutes. The PIC code or CIC of the class 5 switch 120 may be designated by the local phone company to change the standard telephone 122 from the standard or default long distance plan to the wireless dialing plan. The PIC code or CIC may be designated by the class 5 switch 120 or by the mobile switching center 102 for ensuring that the outgoing calls are routed through trunks, providers, or equipment associated with the wireless carrier.

In another embodiment, the class 5 switch 120 may use the local carrier's long distance resources and subsequently bill the wireless carrier for minutes and services used. The interaction may be based on a contract or ongoing agreement between the local phone provider and the wireless carrier. The agreement may be a profit sharing, fee splitting, cost sharing, or other form of revenue agreement that allows the virtual dialing from the local phone provider and integration with a wireless service plan.

A special dial tone, message, web alert, or other feedback may specify that the standard telephone 122 is using the wireless service plan of the wireless device 124 when outgoing calls are made. For example, the standard telephone may sound a double chirp when the standard telephone 122 is using the virtual number for incoming and outgoing calls.

By providing user input, the user effectively registers the virtual number with the class 5 switch 120 for the purpose of rerouting phone calls being sent and received from the standard telephone 122. In one embodiment, the class 5 switch 120 uses bill tracking to note that the outgoing calls are originating from the virtual number rather than the number commonly associated with the standard telephone 122. The user may cancel use of the virtual number at any time by reentering the routing command or other cancellation command.

Separate agreements between the wireless user, the owner of the class 5 switch 120, and the mobile switching center 102 may be required to allow the call routing herein described. For example, the wireless service provider or wireless carrier that owns the MSC 102 may need to have an agreement or contract in place with a local telephone company that owns the class 5 switch 120 for allowing the calls from the virtual number to be routed through the mobile switching center 102 to the intended recipient. The calls are sent and received from the wireless carrier and the wireless carrier identifies the local line as a virtual number and tracks normal minutes of use for billing purposes. The two parties may be required to establish a service fee, fee arrangement, fee sharing, or other terms of compensation, collaboration, or mutual understanding. For example, the local telephone company may require that 1.5 cents per minute be paid in compensation for calls originally destined for the wireless device 124 that are routed through the class 5 switch 120 to the standard telephone 122.

In one embodiment, the local carrier may supply the virtual number that is used to make outgoing calls. The outgoing calls may be routed through the mobile switching center through long distance resources of the wireless carrier. Alternatively, the outgoing calls may be sent through the long distance resources of the local carrier based on a fee agreement between the local carrier and the wireless carrier.

Similarly, the local telephone company may agree with the wireless service provider that outgoing calls that are made using the service plan of the wireless device 124 incur a base fee or usage fee paid to the local telephone company. For example, the local telephone company may be paid a one third proportion of any fees collected for outgoing calls. The terms of an agreement to have a virtual wireless number for call routing are part of a wireless service contract between individuals and groups.

The wireless user may unregister or deregister the call routing in any number of ways. For example, the wireless user may use the standard telephone 122 or a wireless device to enter a deactivation trigger such as *79. The illustrative embodiments of the present invention are particularly useful for wireless service providers that want to fully utilize their wireless service plan or that may not have complete coverage in rural areas or other areas that are hard to cover such as mountainous regions. As a result, when at home, the wireless user may trigger the call routing so that all outgoing phone calls are sent using the wireless service plan. In many cases, the standard telephone 122 has a better battery life and the handset is more durable and functional for sending numerous calls.

Figure 2:
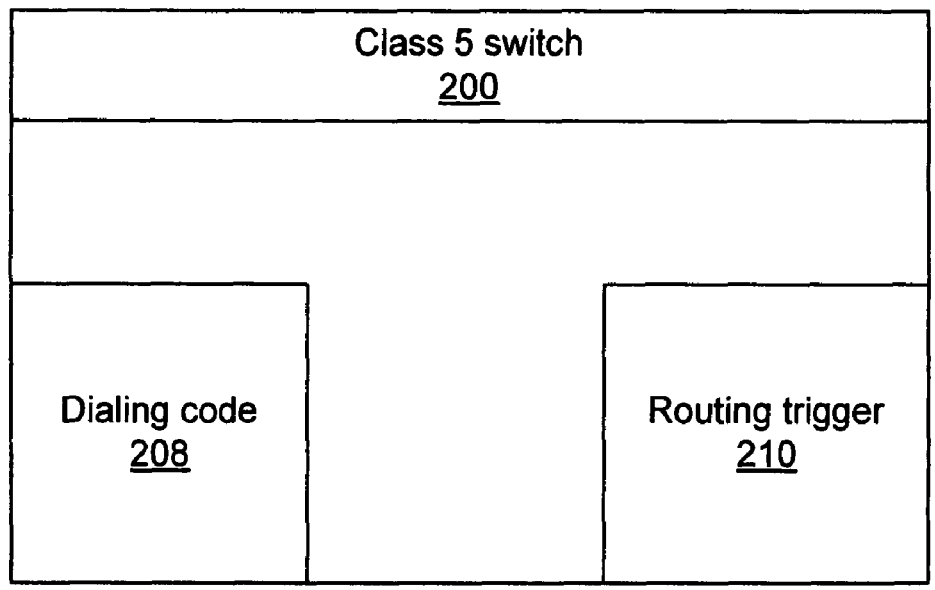
FIG. 2 is a block diagram of a class 5 switch in accordance with the illustrative embodiments of the present invention.

FIG. 2 is a block diagram of a class 5 switch in accordance with an embodiment of the present invention. The class 5 switch 200 is a particular implementation of the class 5 switch 120 of FIG. 1. The class 5 switch 200 includes numerous hardware and software elements used by standard telephone switches that are not described herein. Additionally, the class 5 switch 200 includes software modules for implementing aspects of the present invention. In one embodiment, the modules of the class 5 switch 200 include a dialing code 208, and a call trigger 210. The database elements of the class 5 switch 200 may be multiple databases, registries, or records or may be integrated into a single database internally or externally accessible by the class 5 switch.

In another embodiment, the modules may be part of an external VLR or artificial intelligence network (AIN) device in communication with the class 5 switch 200. The external AIN device may receive commands from the class 5 switch 200 and pass messages and instructions back to the class 5 switch 200 for performing the actions and features described for each component. In one example, the class 5 switch 200 and the external device may be separately owned or operated and communicating to accomplish the method and features herein described.

The wireless service plan may include a virtual or ghost number. The virtual number is a number that shares minutes and service options with other wireless devices under a single wireless service plan without being linked to a physical wireless device. The user may use the ghost number for registering for roaming with the class 5 switch 200. This enables a user to use a wireless service plan for incoming and outgoing minutes without having a physical wireless device linked to the ghost number. For example, the ghost number may be registered with the class 5 switch so that all outgoing calls made from a standard telephone appear to originate from the ghost number. The user may also have calls destined for the ghost number routed to the standard telephone.

The dialing code 208 is a database or registry that stores information that allows the class 5 switch 200 to route outgoing phone calls from the standard telephone using the wireless service plan. In one example, the dialing code 208 stores a primary interexchange carrier (PIC) code or circuit identification code that is used to route the outgoing calls through a wireless network. Each code identifies a service carrier, trunk, network or other resources that allow the outgoing phone call to be made using the wireless carrier's resources and therefore the wireless minutes allotted the wireless device or virtual number. The PIC code or CIC may work in conjunction with an inter machine trunk (IMT) between the wireless carrier and local carrier operating the class 5 switch 200. The inter machine trunk is a designated line, trunk or connection between a telephone network operating the class 5 switch 200 and resources of a wireless network. The dialing code 208 routes calls outside the normal equal access PIC code a user has for wireless long distance service. This secondary PIC code may allow the user to access calling features of the wireless service provider from the class 5 switch 200 during the roaming state.

In one example, the dialing code 208 may be a database that stores information in the VIR database 202 or an external AIN database that allows the class 5 switch 200 to route outgoing calls from the standard telephone to the wireless network for call handling as if the calls were made from the wireless device. In particular, the dialing code 208 may store information specifying which trunk group to use to reach the wireless carrier's network instead of using the long distance service of the wire line service and corresponding standard telephone. The dialing codes 208 may identify a special trunk to the wireless carrier so that the user may use a wireless service plan to make outgoing phone calls. For example, the user may use the standard telephone to make long distance phone calls using the wireless service plan and "minutes" and "free nights and weekends" available through the wireless plan.

The routing trigger 210 may be a module that responds to a routing command from a user that enables call routing from the wireless device to the standard telephone and for outgoing calls. For example, once a user enters a code such as *79, the class 5 switch 200 may activate the dialing code 208 so that all outgoing calls are made using the virtual number and billed to the wireless service plan. In one embodiment, the user may be able to toggle between default service of the standard telephone and the wireless service by pressing a "ghost" button once or the flash button multiple times or using another sequence code or identifier. During the time the virtual number is activated, the class 5 switch changes a table or database for the equal access long distance PIC code to the wireless carrier PIC or CIC code so that all long distance calls are passed to the wireless carrier network CIC is a SS7 term used to identify a particular circuit within a trunk group. For example, CIC is a four-digit code that is used to identify each carrier within North America. That terminating switch may be any type of switch or network for wireless-to-wireless or wireless-to-long-distance calling.

The class 5 switch 200 may also include additional databases or specialized billing software or modules for tracking calls from the virtual number. For example, a database may ensure that the outgoing calls using virtual numbers are allowed from the standard telephone based on previous agreements or other arrangements. The database may also store one or more virtual numbers that may be used from the standard telephone, passwords or identifiers enabling each of the virtual numbers, a number of the home or standard telephone, the mobile systems international subscriber identity number (MSISDN), a subscriber name, a mobile service identifier, and an identification number. Automated features may also be added that may include time of day roaming. For example, the user may set up automated routing so that at 7 p.m., when free minutes are available through the wireless plan, all calls destined for the wireless device are automatically routed to the standard telephone.

Figure 3:
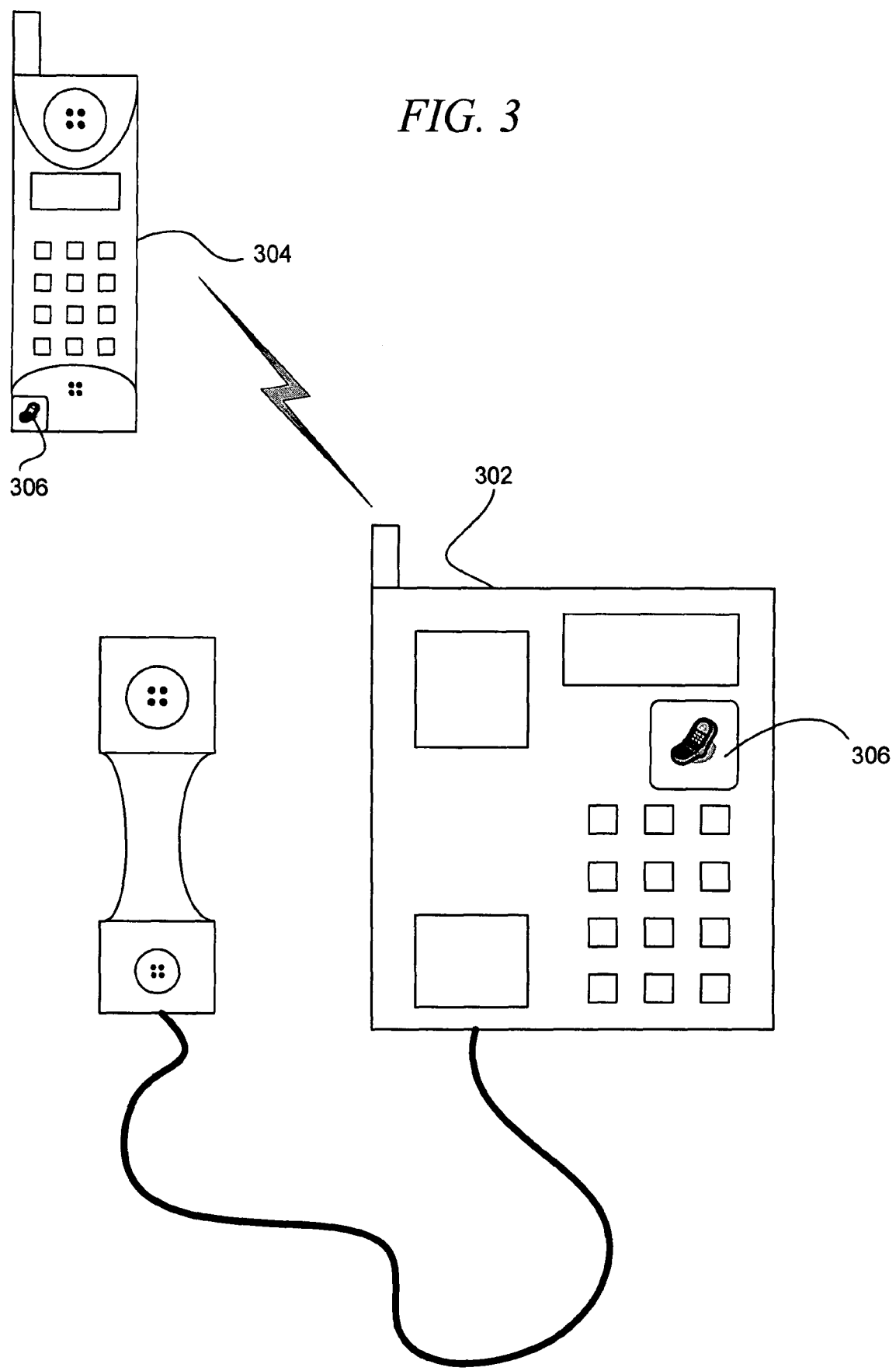
FIG. 3 shows examples of communications devices in accordance with the illustrative embodiments of the present invention.

FIG. 3 shows examples of communications devices in accordance with an embodiment of the present invention. FIG. 3 includes a standard telephone 302 and a cordless telephone 304. The standard telephone 302 and the cordless telephone 304 may include a routing button 306. The routing button may be an interface that allows the user to send a signal or routing command to a class 5 switch for activating call routing from a virtual number to the standard telephone 302. For example, the routing button 306 may be a graphical user interface, touch screen, voice command, scroll wheel, or other input device that generates the command signal for transmission to the class 5 switch when pressed, selected, or otherwise activated. The standard telephone 302 and cordless telephone 304 are particular implementations of the standard telephone 122 of FIG. 1.

The standard telephone 302 and cordless telephone 304 are telephones that operate in conjunction with a publicly switched network and class 5 switch. In another embodiment, the communication service accessible from the standard telephone 302 and the cordless telephone 304 may be part of a voice over Internet protocol (VoIP) telephone service. The standard telephone 302 and cordless telephone 304 are provided dial tone through a wired connection to a home, business or other location in which the standard telephone 302 and cordless telephone 304 are located.

Figure 4:
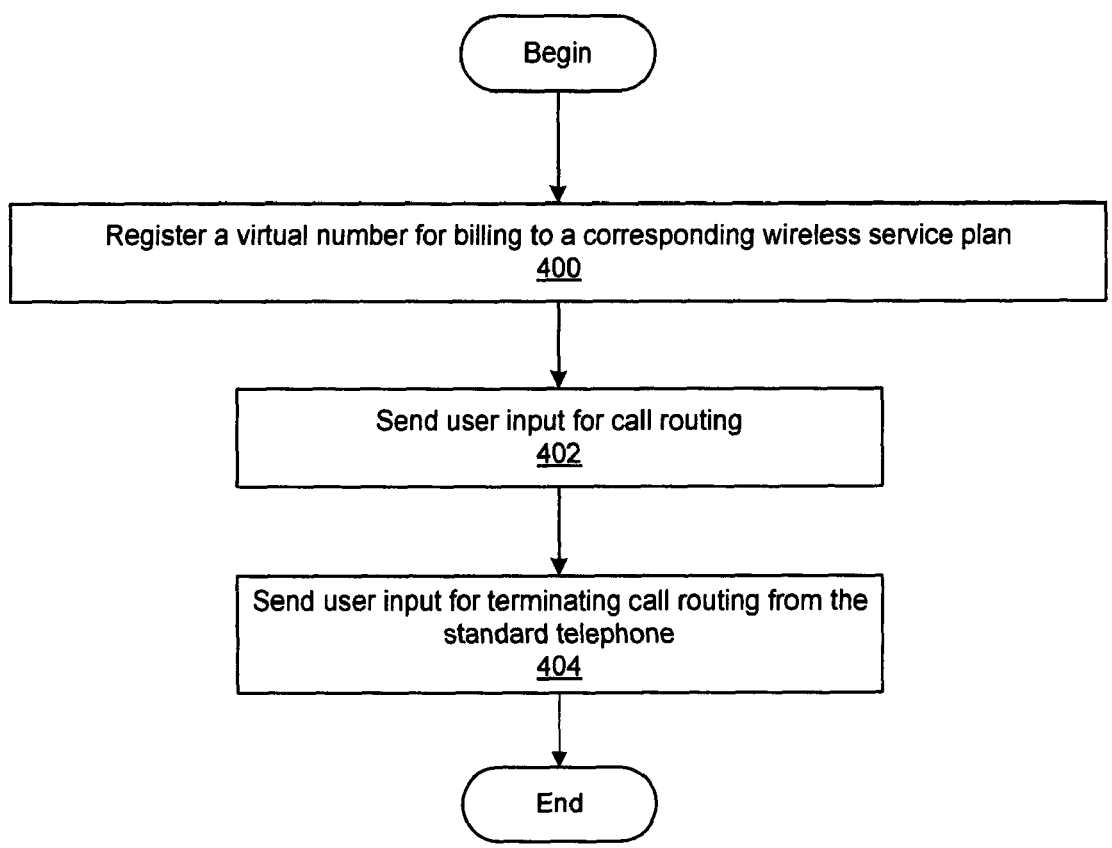
FIG. 4 is a flowchart of a process for communication using a wireless device in accordance with the illustrative embodiments of the present invention.

FIG. 4 is a flowchart of a process for communication using a wireless device in accordance with an embodiment of the present invention. The process of FIG. 4 may be implemented by a wireless device or standard telephone. The process begins by registering a virtual number for billing to a corresponding wireless service plan (step 400). In one embodiment, step 400 may be performed when a user signs up for standard land line, VoIP, or wireless telephone service and may require the information specified or limited information. Step 400 may also be performed as an additional service request available through the local carrier or wireless provider.

Next, the wireless device sends user input for call routing (step 402). The user input may be a routing command received using a graphical user interface, touch screen, button, knobs, scroll, wheel or other interfaces or mechanisms of the standard telephone. User access and input for registering and unregistering the wireless device may be provided via interfaces, such as voice command portals, interactive voice response (IVR), web based and mobile web portal based user control systems, wireless (short message service) SMS interfaces, and other wire line and wireless control interfaces. The user input may also be sent by entering a set dialed command, through a website interface, a text message, based on preset times or preferences, or by dialing a 1-800 number, or sending a message, code, or password from a device.

In one embodiment, step 402 ensures that all outgoing calls originating from the standard telephone are sent from the class 5 switch to a mobile switching center for subsequent routing. In another embodiment, the outgoing calls are routed to the recipient by the local carrier with any long distances charges, fees, or expenses passed to the wireless service plan associated with the virtual number. In one embodiment, the user selects to have call routing to and from the standard telephone by pressing "*79." In another embodiment, the user selects to have calls to the wireless device routed by pressing a routing button on a standard telephone. During the time the wireless service plan is accessible from the class 5 switch, the switch may play a modified dial tone and/or provide some other audible or visual signal that the routing condition exists.

Next, the wireless device sends user input for terminating call routing from the standard telephone (step 404) with the process terminating thereafter. The user input may be received by the user dialing *79 using the standard telephone or entering a cancellation command.

Figure 5:
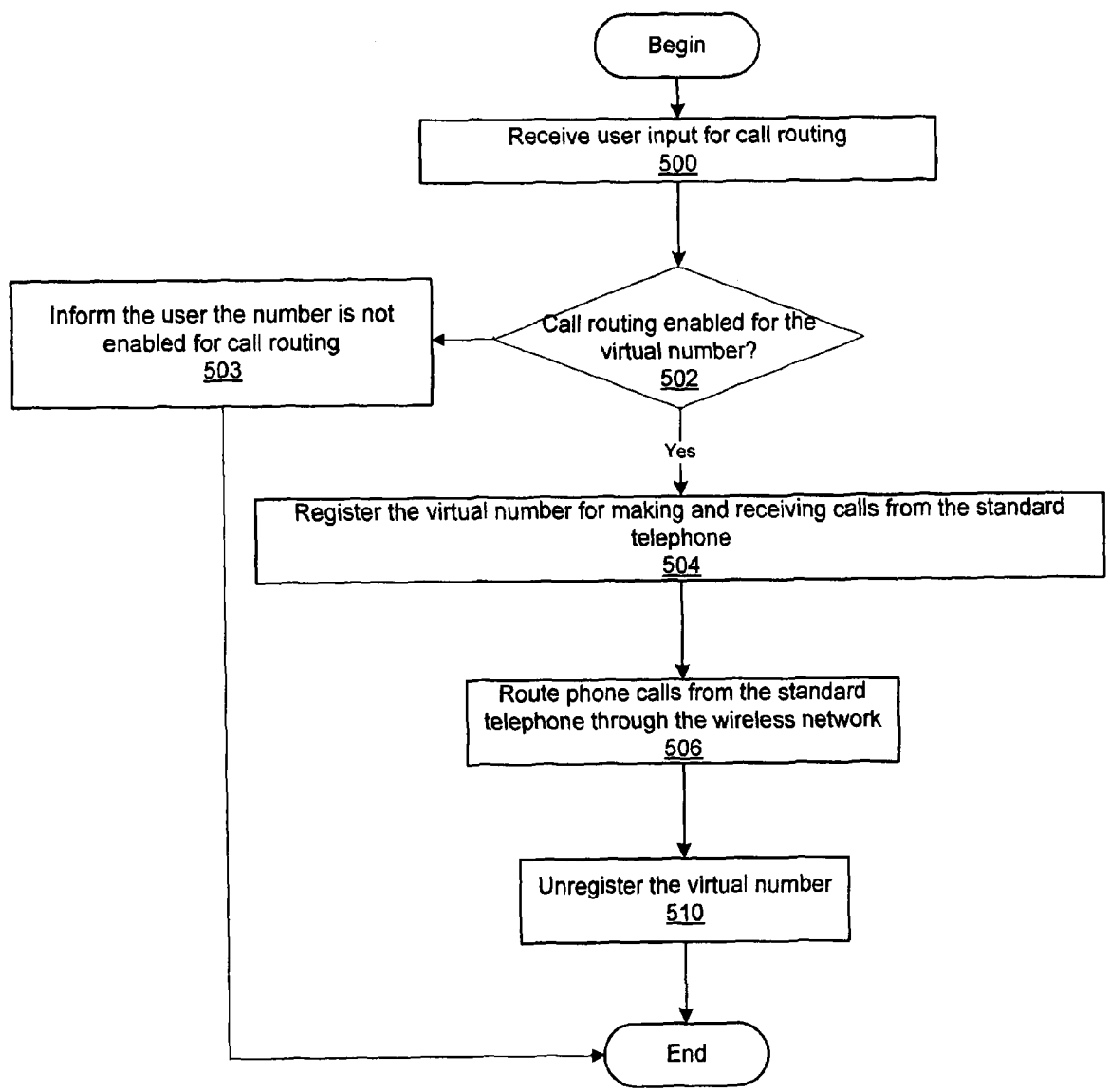
FIG. 5 is a flowchart of a process for communication using a class 5 switch in accordance with the illustrative embodiments of the present invention.

FIG. 5 is a flowchart of a process for communication using a class 5 switch in accordance with an embodiment of the present invention. The process of FIG. 5 may be implemented by a communications system and particularly by a class 5 switch with enhanced routing functionality. The process of FIG. 5 begins by first receiving user input for call routing (step 500). The user input may be received or entered by a wireless user. For example, the user may enter *79 or press a routing button on a standard telephone.

Next, the class 5 switch determines whether call routing is enabled for the virtual number (step 502). The call routing is enabled if there is an agreement between the wireless service provider and the publicly switched network to allow virtual roaming on the publicly switched network. The class 5 switch may use a database, registry, or other record to determine if the virtual number is registered for routing calls from a standard telephone number. If the virtual number is not enabled, the class 5 switch informs the user the number is not enabled for call routing (step 503). Call routing is a form of virtual roaming in which incoming and outgoing calls for the wireless device are received and sent from the standard telephone. The user may be notified by an error message, text message, or other indicator. In another embodiment, nothing happens indicating the wireless device is not enabled for call routing.

Next, the class 5 switch registers the virtual number for making and receiving calls from the standard telephone (step 504). The standard telephone may be a VoIP phone or a phone enabled through a phone network. The wireless device may be registered by registering or associating the virtual number with the standard telephone number, enabling a special dialing code, or by notifying the bill tracking software that outgoing calls originate from the virtual number.

Next, the class 5 switch routes phone calls from the standard telephone through the wireless network (step 506). In step 506, calls, text messages, and other data from the standard telephone are routed or forwarded from the class 5 switch to a MSC or other wireless network device or connection so that the call can be sent and billed to the wireless service plan. The phone calls may be routed through an inter machine trunk to the wireless network and wireless carrier using a PIC code or CIC. From the wireless carrier the outgoing call may be routed through long distance affiliates, trunks, lines, devices or other resources to the intended recipient.

Next the intended recipient receives the call as if it originated from the virtual number and not the standard telephone. For example, if the intended recipient has caller identification, the caller identification will show the virtual number and associated information rather than the number and information from the standard telephone. In step 506, the minutes and service used for outgoing calls are billed to the wireless service plan associated with the virtual number.

Next, the class 5 switch unregisters the virtual number (step 510) with the process terminating thereafter. Step 510 may be initiated in response to receiving user input to disable the routing enabled in step 504. The user may manually select to end the routing by entering a code, message, password, or identifier, such as pressing *79.

Various embodiments of the present invention provide a system and method for making calls from a virtual number. A virtual number is registered with a database of the wired telephone switch. Outgoing calls placed from the standard telephone are routed from the class 5 switch to the mobile switching center or wireless network resources for further routing to the intended recipient. The outgoing calls are billed to the wireless service plan and appear to have originated from the virtual number rather than the standard telephone. In many cases, the quality of service is improved because telephone calls are sent through a wired connection rather than wirelessly.

The previous detailed description is of a small number of embodiments for implementing the invention and is not intended to be limiting in scope. The following claims set forth a number of the embodiments of the invention disclosed with greater particularity.

What is claimed

1. A method for call routing from a wired telephone switch, said method comprising:
    registering a virtual number with a database of the wired telephone switch for call routing, the virtual number along with one or more phone numbers are associated with a wireless service plan of a user provided by a wireless service provider;
    associating the virtual number with a standard telephone used by the user, the standard telephone operable to be used without the user having a landline service agreement with a landline service provider, wherein service to the standard telephone is provided by the landline service provider based on an agreement between the wireless service provider and the landline service provider, and wherein usage of the standard telephone by the user is based on the wireless service plan of the user with the wireless service provider;
    routing outgoing calls made from the standard telephone utilizing the virtual number;
    associating one of the one or more phone numbers that are associated with the wireless service plan with the virtual number to enable the outgoing calls made from the standard telephone to appear as if the outgoing calls originated from the one of the one or more phone numbers that is associated with the virtual number, wherein the one of the one or more phone numbers associated with the virtual number may be changed at any time by the user to any of the one or more phone numbers that are associated with the wireless service plan; and
    unregistering the virtual number to disable the call routing from the standard telephone.

2. The method according to claim 1, wherein the wired telephone switch is a class 5 switch used in a publicly switched network.

3. The method according to claim 1, wherein registering is performed in response to receiving a user input.

4. The method according to claim 1, wherein unregistering further comprises:
    receiving user input to terminate the call routing; and
    terminating the call routing to the standard telephone.

5. The method according to claim 4, wherein the user input comprises dialing a phone number on a wireless device associated with the wireless service plan of the user.

6. The method according to claim 1, wherein the outgoing calls include call information linked to the virtual number.

7. The method according to claim 6, wherein the virtual number uses minutes and services included in a wireless service plan.

8. The method according to claim 1, wherein routing outgoing calls further comprises:
    routing the outgoing calls through a wireless network associated with the virtual number.

9. The method according to claim 1, wherein the virtual number is provided by a local carrier.

10. The method according to claim 1, further comprising:
    routing incoming calls destined for the virtual number to the standard telephone.

11. The method according to claim 7, further comprising:
    monitoring a time duration associated with the outgoing calls from the standard telephone;
    determining a called number associated with the outgoing calls from the standard telephone;
    billing the time duration associated with the outgoing calls from the standard telephone to the one or more phone numbers associated with the wireless service plan of the user as free minutes;
    billing the time duration associated with the outgoing calls from the standard telephone to not one of the one or more phone numbers associated with the wireless service plan of the user as billed minutes against associated with the wireless service plan.

12. The method according to claim 1, wherein routing the outgoing calls is performed using a trunk line and a dialing code.

13. The method according to claim 12, wherein the dialing code is any of a primary interexchange carrier and a circuit identification carrier.

14. The method according to claim 1, further comprising:
    determining whether the virtual number is registered for roaming to the wired telephone switch.

15. The method according to claim 1, further comprising:
establishing a profit sharing agreement between a local telephone provider and a wireless service provider.

16. A wired telephone switch comprising:
a processor configured to execute instructions within software modules;
a memory operatively connected to the processor for storing the software modules including:
a routing trigger configured to register a wireless device as roaming with the wired telephone switch operative to route outgoing calls from a standard telephone through a wireless network, the standard telephone associated with a virtual number included in a wireless service plan of a user provided by a wireless service provider of the wireless network, the standard telephone operable to be used by the user without the user having a landline service agreement with a landline service provider, wherein service to the standard telephone is provided by the landline service provider based on an agreement between the wireless service provider and the landline service provider;
a database configured to store a dialing code associated with the wireless device operative to route the outgoing calls to an intended recipient; and
the processor operable to execute instructions within the software modules for associating one of the one or more phone numbers that are associated with the wireless service plan with the virtual number to enable the outgoing calls made from the standard telephone to appear as if the outgoing calls originated from the one of the one or more phone numbers that is associated with the virtual number, wherein the one of the one or more phone numbers associated with the virtual number may be changed at any time by the user to any of the one or more phone numbers that are associated with the wireless service plan, and wherein the processor is further operable to execute instructions within the software modules for unregistering the virtual number to disable the call routing from the standard telephone.

17. The wired telephone switch according to claim 15, wherein the outgoing call is routed through the wireless network associated with the virtual number.

18. The wired telephone switch according to claim 15, wherein the software modules further comprising:
a database for storing the virtual number, a mobile service identifier, and a phone number of a standard telephone for updating a home location register of the wireless network in communication with the wired telephone switch.

19. The wired telephone switch according to claim 15, wherein the software modules further comprising:
a record indicating a plurality of virtual numbers that may roam to the wired telephone switch.

20. The wired telephone switch according to claim 15, wherein an agreement between a local telephone provider operating the wired telephone switch and a wireless service provider operating the wireless network allows the outgoing calls to be routed from the standard telephone through the wireless network wherein the agreement allocates a portion of the fees collected for the outgoing calls to the local telephone provider.

21. A method for call routing from a wired telephone switch, said method comprising:
registering a virtual number with a database of the wired telephone switch;
routing outgoing calls made from a standard telephone to a wireless network using a trunk and a dialing code;
billing minutes used by the outgoing calls to a wireless service plan associated with the virtual number, the virtual number along with one or more phone numbers are associated with the wireless service plan of a user provided by a wireless service provider, the standard telephone operable to be used by the user without the user having a landline service agreement with a landline service provider operating the wired telephone switch, wherein service to the standard telephone is provided by the landline service provider based on an agreement between the wireless service provider and the landline service provider, and wherein usage of the standard telephone by the user is based on the wireless service plan of the user with the wireless service provider;
associating one of the one or more phone numbers that are associated with the wireless service plan with the virtual number to enable the outgoing calls made from the standard telephone to appear as if the outgoing calls originated from the one of the one or more phone numbers that is associated with the virtual number, wherein the one of the one or more phone numbers associated with the virtual number may be changed at any time by the user to any of the one or more phone numbers that are associated with the wireless service plan; and
unregistering the wireless device to disable the call routing of the virtual number from the standard telephone.

22. The method according to claim 21, wherein routing outgoing calls comprises:
routing the outgoing calls through local carrier resources providing telephone service to the standard telephone.

23. The method according to claim 21, wherein routing outgoing calls comprises:
routing the outgoing calls through long distance resources of the wireless service provider.

24. The method according to claim 21, further comprising:
establishing a profit sharing agreement between the landline service provider and the wireless service provider.

* * * * *